United States Patent
Kaplan et al.

(10) Patent No.: US 7,123,171 B2
(45) Date of Patent: *Oct. 17, 2006

(54) RFID READERS AND RFID TAGS COMMUNICATING USING EXTENSIBLE BIT VECTORS

(75) Inventors: David Kaplan, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/348,494

(22) Filed: Feb. 6, 2006

(65) Prior Publication Data

US 2006/0187094 A1 Aug. 24, 2006

Related U.S. Application Data

(63) Continuation of application No. 11/031,459, filed on Jan. 7, 2005, now Pat. No. 7,030,786.

(60) Provisional application No. 60/610,808, filed on Sep. 17, 2004, provisional application No. 60/574,359, filed on May 24, 2004.

(51) Int. Cl.
*H03M 7/00* (2006.01)

(52) U.S. Cl. ............... 341/50; 340/10.1; 340/10.41

(58) Field of Classification Search .......... 341/50, 341/53, 70; 340/10.1, 10.41; 72/15.1
See application file for complete search history.

(56) References Cited

U.S. PATENT DOCUMENTS

| | | | | |
|---|---|---|---|---|
| 6,047,579 A * | 4/2000 | Schmitz | ............. | 72/15.1 |
| 6,107,910 A * | 8/2000 | Nysen | ............. | 340/10.1 |
| 6,265,963 B1 * | 7/2001 | Wood, Jr. | ............. | 340/10.4 |
| 6,580,358 B1 * | 6/2003 | Nysen | ............. | 340/10.41 |
| 6,693,513 B1 * | 2/2004 | Tuttle | ............. | 340/10.1 |
| 6,784,813 B1 * | 8/2004 | Shanks et al. | ............. | 341/53 |
| 6,812,824 B1 * | 11/2004 | Goldinger et al. | ............. | 340/10.1 |
| 6,946,951 B1 * | 9/2005 | Cole et al. | ............. | 340/10.1 |
| 6,963,295 B1 * | 11/2005 | Greene et al. | ............. | 341/70 |

* cited by examiner

*Primary Examiner*—Jean Bruner Jeanglaude
(74) *Attorney, Agent, or Firm*—Merchant & Gould

(57) ABSTRACT

RFID system components, such as readers and tags, communicate by transmitting and receiving a wave that conveys a bit stream. Informing signals, such as special bits, are inserted in the stream between words. An informing signal indicates whether a certain word is the last word in the stream or not.

12 Claims, 7 Drawing Sheets

*RFID SYSTEM*

SIGNAL PATH DURING R→T

SIGNAL PATH DURING T→R

RFID READERS AND RFID TAGS COMMUNICATING USING EXTENSIBLE BIT VECTORS

RELATED APPLICATIONS

This application is a continuation of U.S. Patent Ser. No. 11/031,459 now U.S. Pat. No. 7,030,786, which is incorporated herein by reference.

This application claims the benefit of U.S. Provisional Applications Ser. No. 60/610,808 filed on Sep. 17, 2004 and Ser. No. 60/574,359 filed on May 24, 2004, which is hereby claimed under 35 U.S.C. §119(e). Both Provisional Applications are incorporated herein by reference.

FIELD OF THE INVENTION

The present invention relates to Radio Frequency IDentification (RFID) systems components, more particularly, to system components and methods of employing an informing signal in a data stream to determine an ending of the stream in RFID communication.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a power storage device, such as a battery. RFID tags with a power storage device are known as active tags. Advances in semiconductor technology have miniaturized the electronics so much that an RFID tag can be powered solely by the RF signal it receives. Such RFID tags do not include a power storage device, and are called passive tags.

SUMMARY

The invention facilitates communication between RFID system components. Accordingly, the invention provides RFID readers and RFID tags, and methods for their communication.

In some embodiments, RFID system components, such as readers and tags, communicate by transmitting and receiving a wave that conveys a bit stream. Informing signals, such as special bits, are inserted in the stream between words. An informing signal indicates whether a certain word is the last word in the stream or not.

According to another embodiment, an RFID system component in a receive mode receives a stream of bits, isolates a group of bits from the stream, designates at least one of the isolated bits as an informing bit, and the remaining bits as a word. The word may be appended to a previously similarly designated word, for forming a reception block. If the informing bit equals a preset termination, the component terminates the appending and performs an action that uses the reception block as one of a memory address and content of the memory.

According to an embodiment, an RFID system component in a transmit mode retrieves a block of bit, and isolates a word of bits that occur sequentially in the block. The component appends an informing bit and the bits of the isolated word to a transmission stream. The informing bit equals a preset termination if the isolated bits are the last ones in the block, and does not equal the preset termination otherwise.

BRIEF DESCRIPTION OF THE DRAWINGS

Non-limiting and non-exhaustive embodiments are described with reference to the following drawings.

DETAILED DESCRIPTION

Figure 1:
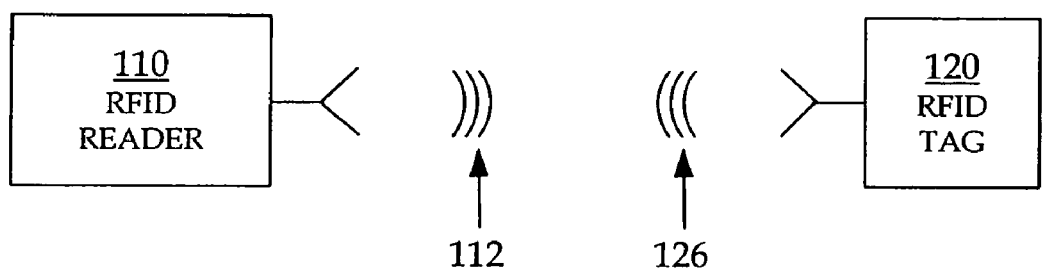
FIG. 1 illustrates components of a typical RFID system, with an RFID reader and an RFID tag.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably throughout the text and claims with the terms "reader" and "tag".

In addition, most of what is written herein about an RFID reader applies also to an RFID tag, and vice versa, as will be determined by a person skilled in the art.

FIG. 1 is a diagram of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a preamble, a null symbol, and so on. Further symbols can be implemented for exchanging binary data, such as "0" and "1".

Tag 120 can be a passive tag or an active tag, i.e. having its own power source. Where tag 120 is a passive tag, it is powered from wave 112.

Figure 2:
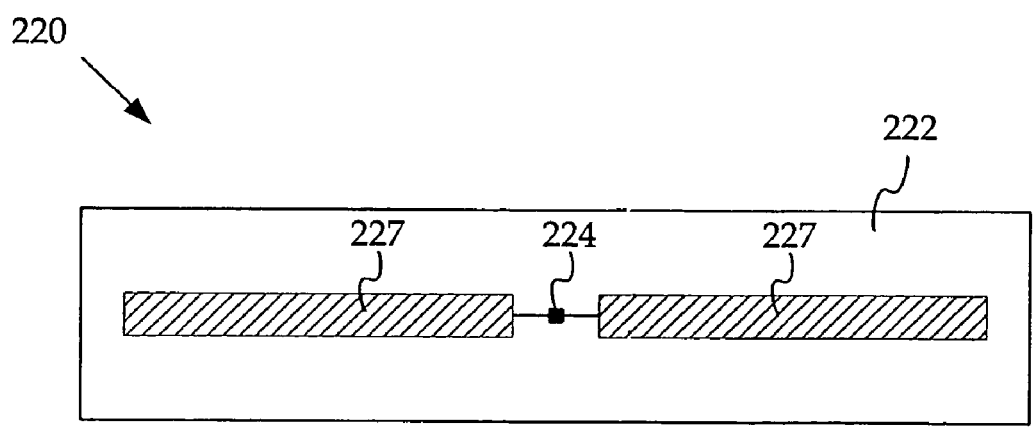
FIG. 2 is a diagram of an RFID tag such as the RFID tag shown in FIG. 1.

FIG. 2 is a diagram of an RFID tag 220. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 also includes two antenna segments 227, which are usually flat and attached to inlay 222. Antenna segments 227 are shown here forming a dipole, but many other embodiments using any number of antenna segments are possible.

Tag 220 also includes an electrical circuit, which is preferably implemented in an integrated circuit (IC) 224. IC 224 is also arranged on inlay 222, and electrically coupled to antenna segments 227. Only one method of coupling is shown, while many are possible.

In operation, a signal is received by antenna segments 227, and communicated to IC 224. IC 224 both harvests power, and decides how to reply, if at all. If it has decided to reply, IC 224 modulates the reflectance of antenna segments 227, which generates the backscatter from a wave transmitted by the reader. Coupling together and uncoupling antenna segments 227 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
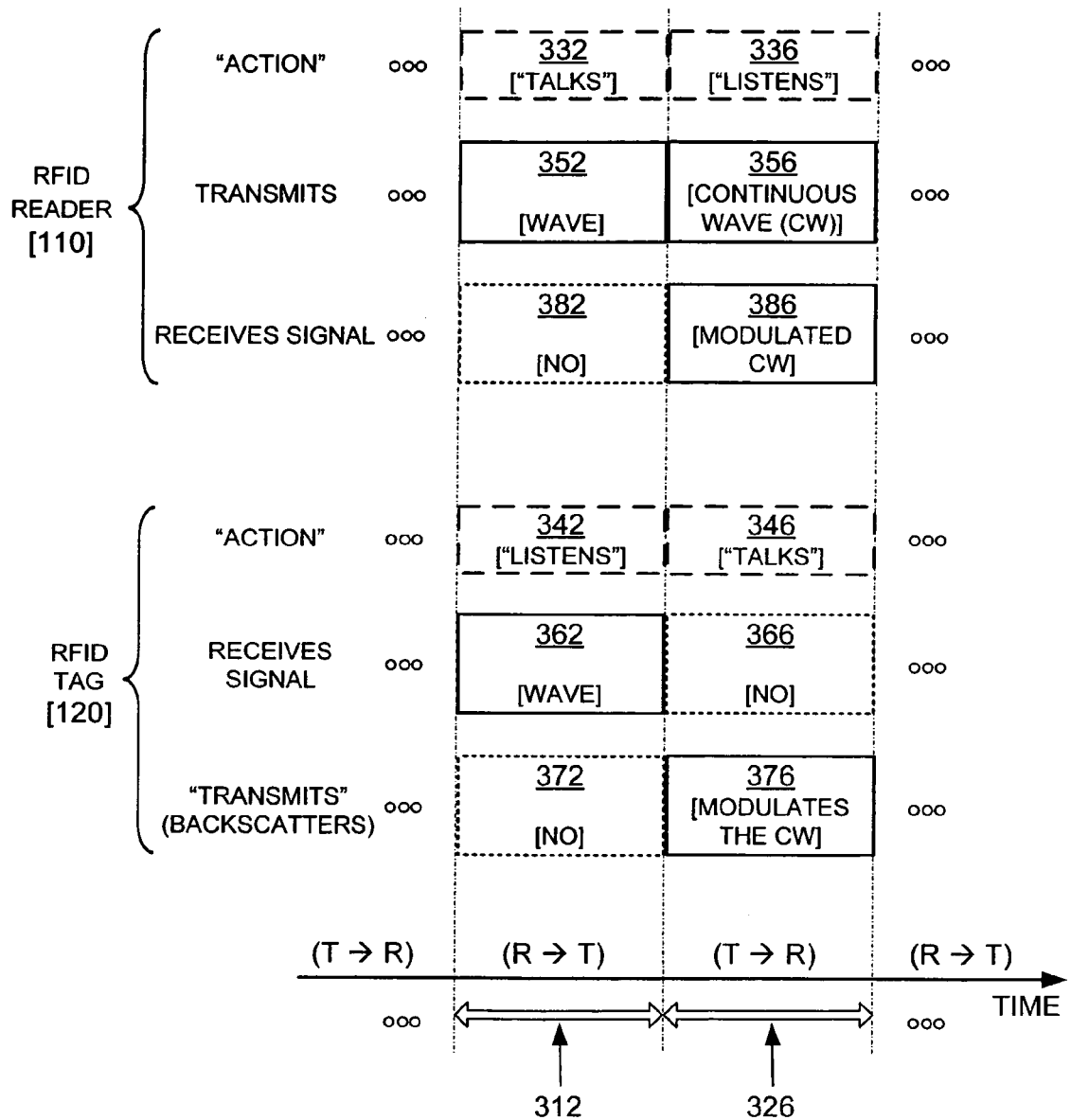
FIG. 3 is a conceptual diagram for explaining a half-duplex mode of communication between the components of the RFID system of FIG. 1, during normal operation in the field.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the session is designated as "R→T", and when tag 120 talks to reader 110 the session is designated as "T→R". Along the TIME axis, a sample R→T session occurs during a time interval 312, and a following sample T→R session occurs during a time interval 326. Of course intervals 312, 326 can be of different durations—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
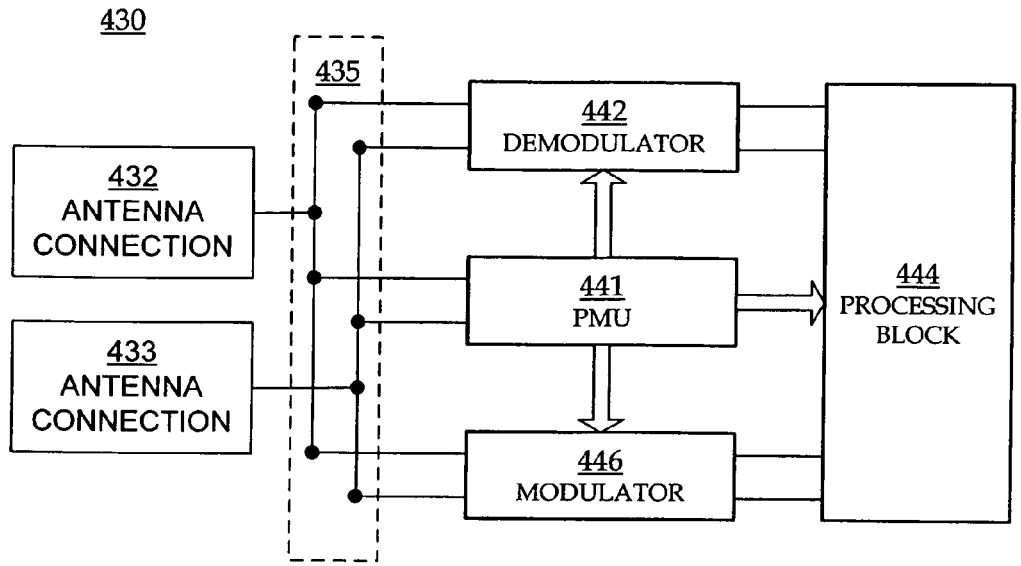
FIG. 4 is a block diagram illustrating one embodiment of an electrical circuit that may be employed in an RFID tag such as the RFID tag of FIG. 2.

FIG. 4 is a block diagram of an electrical circuit 430. Circuit 430 may be formed in an IC of an RFID tag, such as IC 224 of FIG. 2. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to antenna segments (not shown in FIG. 4). Antenna connections 432, 433 may be made in any suitable way, such as pads and so on. In a number of embodiments more antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both of R→T sessions (when the received RF wave carries a signal) and T→R sessions (when the received RF wave carries no signal).

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter.

It will be recognized at this juncture that circuit 430 can also be the circuit of an RFID reader according to the invention, without needing PMU 441. Indeed, an RFID reader can typically be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session. The treatment of a signal is described below.

Figure 5A:
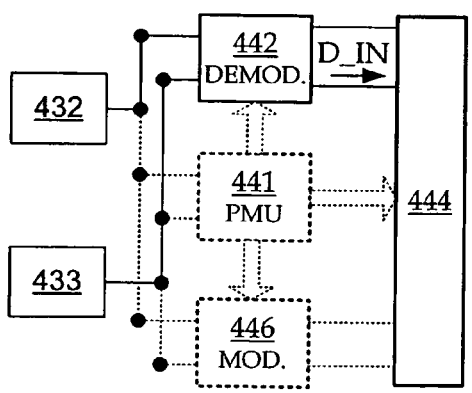
FIGS. 5A and 5B illustrate two versions of the electrical circuit of FIG. 4 emphasizing signal flow in receive and transmit operational modes of the RFID tag, respectively.

FIG. 5A shows version 530-A of circuit 430 of FIG. 4. Version 530-A shows the components of circuit 430 for a tag, further modified to emphasize a signal operation during a R→T session (receive mode of operation) during time interval 312 of FIG. 3. An RF wave is received from antenna connections 432, 433, a signal is demodulated from demodulator 442, and then input to processing block 444 as D_IN. In one embodiment according to the present invention, D_IN may include a received stream of symbols.

Version 530-A shows as relatively obscured those components that do not play a part in processing a signal during a R→T session. Indeed, PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
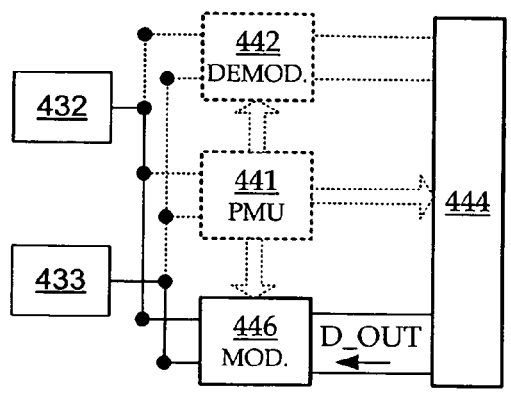

FIG. 5B shows version 530-B of circuit 430 of FIG. 4. Version 530-B shows the components of circuit 430 for a tag, further modified to emphasize a signal operation during a T→R session during time interval 326 of FIG. 3. A signal is output from processing block 444 as D_OUT. In one embodiment according to the present invention, D_OUT may include a transmission stream of symbols. D_OUT is then modulated by modulator 446, and output as an RF wave via antenna connections 432, 433.

Version 530-B shows as relatively obscured those components that do not play a part in processing a signal during a T→R session. Indeed, PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
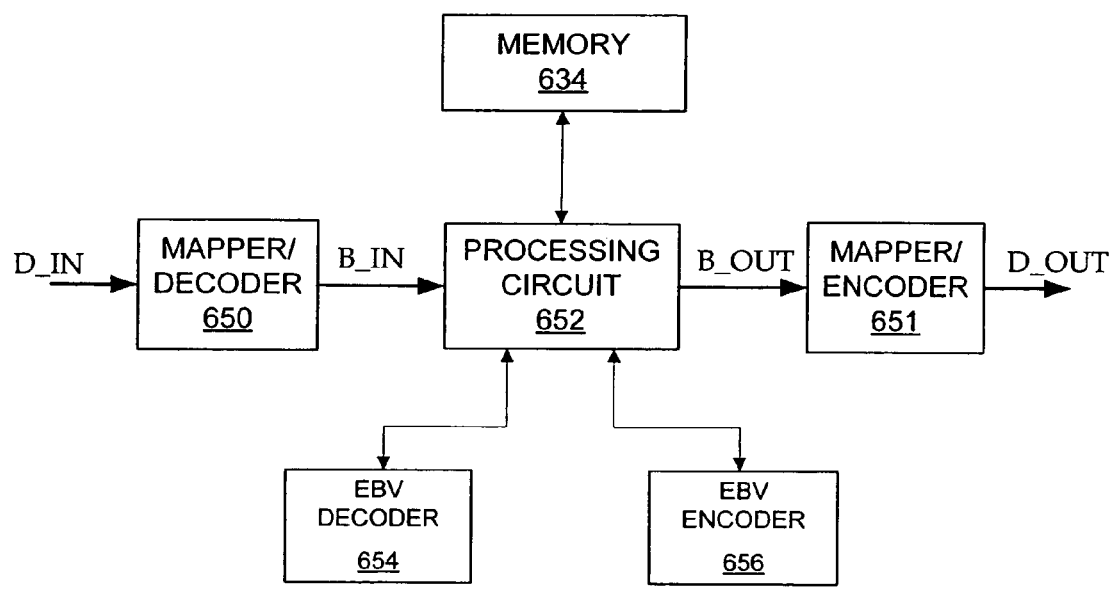
FIG. 6 illustrates one embodiment of a processing block of an RFID tag such as the processing block shown in FIG. 4.

FIG. 6 illustrates one embodiment of processing block 644 of an RFID tag, such as processing block 444 of FIG. 4. In the shown embodiment, processing block 644 includes a memory 634, a mapper/decoder 650, a mapper/encoder 651, a processing circuit 652, an EBV decoder 654, and an EBV encoder 656. In other embodiments, processing block 644 may include fewer or additional components including, but not limited to filtering circuits, memory address decoders, and the like.

In operation, input signal D_IN is input in mapper/decoder 650. Mapper/decoder 650 decodes signal D_IN, and generates a stream of bits B_IN. Decoding is performed by mapping symbols present in signal D_IN into corresponding binary bits. In the preferred embodiment, symbol 1 is mapped into bit 1, and symbol 0 is mapped into bit 0. This mapping reflects a 1:1 correspondence between symbols and bits, although that is not necessarily the case, and other correspondences and mappings are possible.

Stream of bits B_IN is provided to processing circuit 652. Processing circuit 652 is arranged to process B_IN according to a predetermined purpose of processing block 644. In one embodiment, processing circuit 652 may retrieve data associated with B_IN from a memory circuit such as memory 634, and provide encoded bits B_OUT. In another embodiment, processing circuit 652 may store data associated with B_IN into a memory circuit such as memory 634. In yet another embodiment, processing circuit 652 may provide an output bit stream, such as B_OUT in response to B_IN.

Memory 634 is arranged to store data associated with the RFID system component. Such data may be stored during a production stage, or during an operation by processing circuit 652. Accordingly, memory 634 may be implemented from one or more nonvolatile memory cells, nonvolatile memory circuits, volatile memory cells, programmable logic arrays (PLAs), latches, registers, EPROMs, EEPROMs, and the like.

In the event the RFID system component is an RFID tag, the data stored in memory 634 may include identification information associated with the tag, information associated with an item the tag is attached to, communication parameters such as a password, and the like. Accordingly, memory 634 may be partitioned into an object identification portion that is arranged to store a protocol parameter, a tag identification portion to store information associated with a tag identifier, a user portion to store user-specified information, a reserved portion to store at least one system parameter, and the like.

EBV decoder 654 is arranged to decode informing signals regularly occurring between words, isolated from an incoming stream of bits such as B_IN. Depending on whether an informing signal equals a preset termination, EBV decoder 654 may notify processing circuit 652 whether the decoded word is the last word in the stream of bits or not. The termination can be known in advance, or learned during operation, such as from the incoming bit stream.

It is advantageous to choose the informing signal such that it is brief. The advantage is realized when applies to both its values, i.e. whether the informing signal equals the termination or not.

In the preferred embodiment, an informing signal is a single informing bit. The informing bit has a non-termination value of one of the two binary bits (e.g. 0 or 1), and the termination has a value of the other one of the two binary bits (e.g. 1 or 0, respectively).

EBV encoder 656 is arranged to insert an informing signal corresponding to each word, concatenated to form an output stream of bits such as stream B_OUT. In a transmission mode, processing circuit 652 may retrieve a block of bits from memory 634 and separate it into L-bit long words. Depending on a number of L-bit long words, EBV encoder 656 may provide the informing bit to be attached to each L-bit long word. The informing signal associated with the last word may be equal to the termination, indicating the end of the last word of the stream of bits. All other informing signals may be assigned a non-termination value.

As mentioned previously EBV is one method of using an informing signal in communications between an RFID reader and an RFID tag. Other methods known in the art may be implemented without departing from the scope and spirit of the invention. In one embodiment, EBV decoder 654 and EBV encoder 656 may be incorporated into processing circuit 652.

Streams of bits prepared by EBV encoder 656, such as stream B_OUT are input in mapper/encoder 651. Mapper/encoder 651 encodes signal D_OUT from stream B_OUT. Encoding is performed preferably inversely to what was described above in connection with mapper/decoder 650.

Figures 7, 8:
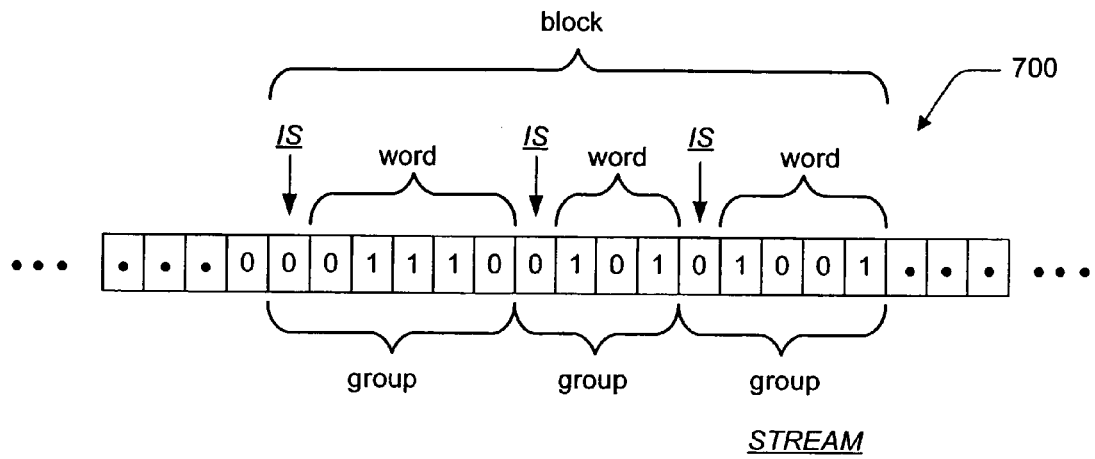
FIG. 7 illustrates an exemplary stream of bits that may be processed in some embodiments.
FIG. 8 is a table illustrating a data structure according to an exemplary implementation.

FIG. 7 illustrates an exemplary stream 700 of bits that may be processed in an RFID tag such as the RFID tag of FIG. 2. For illustration purposes stream 700 is arranged to include three words of varying lengths. Any length of a word and any placement of a word within the stream may be employed without departing from the scope and spirit of the invention. It will be recognized that stream 700 can be either B_IN, or B_OUT, or both, and so on. It will be further recognized that, depending on the correspondences, stream 700 could also be either D_IN, or D_OUT, or both, and so on.

An informing signal (IS) in communications between an RFID reader and an RFID tag may be implemented in a variety of ways. One such method is using a single bit for an information signal in Extensible Bit Vectors (EBVs). An EBV decoder such as EBV decoder 654 of FIG. 6 may be arranged to decode an informing bit or bits of an incoming word. A processing circuit may begin splitting the incoming data stream into words of predetermined length (L+1). For example, each word may be 8 bits long. Because the number of words in each data stream may vary, one of the bits (an informing bit) of each word may be designated to indicate whether that particular word is the last word in the data stream or not.

In exemplary stream 700, the first word is a 5-bit long word with the informing bit (IS) placed at the beginning of the word. The second word in stream 700 is 3 bits long, and the third word is 4 bits long. While the informing bits in stream 700 are placed at the beginning of each word, in other embodiments, the informing bits may be placed differently. For example, the informing bit may be the last bit of each word, or it may be placed at a pre-designated place within each word.

A value ("T") of the informing bit indicating the last word may be predetermined by the communication protocol, or determined by the RFID reader for each data stream and forwarded to the RFID tag. For example, a communication protocol may use the first bit of each word as the informing bit and assign a value of "0" if the particular word is the last word in the data stream, and a value of "1" if there is at least one more word in the data stream. If the first bit has a value of "1", a processing circuit may recognize that there is at least one more word following the current word and continue separating words from the stream.

In stream 700, each informing bit has a value of "0". Because none of the illustrated words is the last word, "0" is a non-T value for this example (i.e. the last word of stream 700 must have a "1" as an informing bit).

FIG. 8 shows table 800 illustrating a data structure according to an exemplary implementation of the present invention. In table 800, informing bits are prepended to the beginning of each word. The word length L is 7 symbols, the termination ("T-") value for the informing bit is "0", and the non-termination ("non-T") value for the informing bit is "1". Equivalently, as also per the above, informing bits can be considered appended to the end of each word.

Column 802 shows exponential notation indicating the value of the data block for each example. Column 804 shows the decimal value of the data block for each example. Column 806 shows the informing bit for each of the first words of each example included in Column 808.

The first example data block (first row) includes a single word of zero value. Accordingly, the decimal value for the data block is zero. Because the data block includes a single word, the value of the informing bit is "0". The second example data block (second row) includes a single word of value one. Accordingly, the decimal value for the data block is one. Because the data block includes a single word, the value of the informing bit is again "0". The third example data block (third row) includes a single word of value 127. Accordingly, the exponential value is $2^7-1$, and the decimal value for the data block is 127. Because the data block includes a single word, the value of the informing bit is again "0".

Column 816 and column 818 show values of the informing bits for the second words of exemplary data blocks, and the second words themselves, respectively. The fourth example data block (fourth row) includes two words. The exponential value for the block is $2^7$. Accordingly, the decimal value for the data block is 128. Because the data block includes two words, the value of the first informing bit is "1" and the value of the second informing bit is "0".

Fifth and sixth example data blocks follow the same pattern described above. The examples provided above are for illustration purposes and do not constitute a limitation on the present invention. Other embodiments may be implemented using other values for the informing bit, other lengths of words, and other placement of the informing bit within a word without departing from the scope and spirit of the invention.

Figure 9:
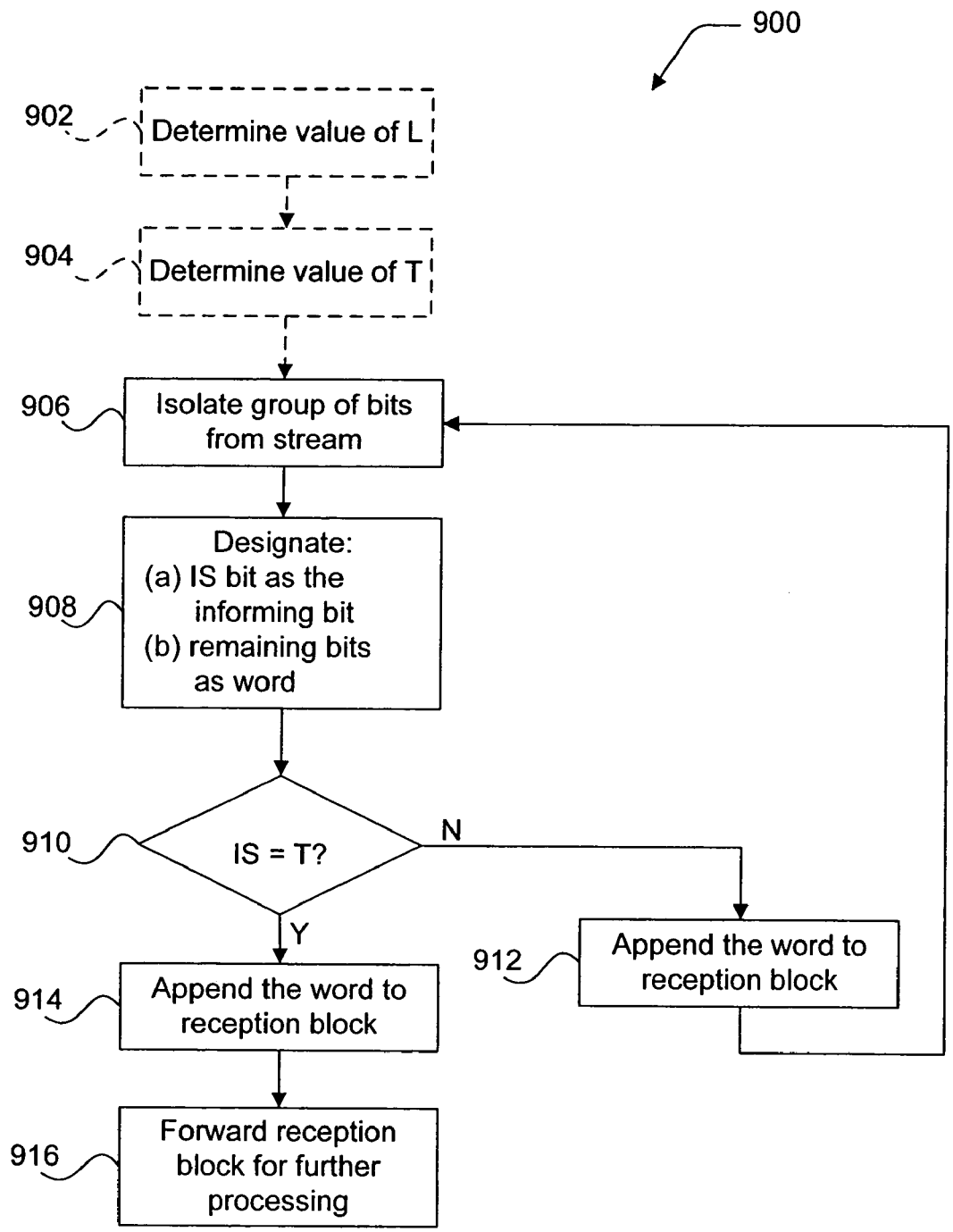
FIG. 9 is a flowchart illustrating one embodiment of a process of a receive mode communication in an RFID system.

FIG. 9 is a flowchart illustrating one embodiment of process 900 for employing an informing signal in a receive mode communication between components of an RFID system. While the communication is described as the tag receiving from the reader, the inverse is also equivalently intended.

Process 900 begins with optional block 902 where a size (L+1) of a group is determined. L is an integer, and is also conveniently designated as the L-number. Similarly, a number designated as (L-number+1) equals L+1. L can be looked up internally, hardwired to operate as a preset number, or communicated from reader to tag.

In one embodiment, L may be determined as part of a communication protocol. In another embodiment, L may be determined by the RFID reader depending on a number of parameters such as security and data amount. In yet another embodiment, wireless data is received from an antenna, and decoded to determine the size. Such can take place, for example, when communication is established between the two components of the RFID system.

Optional block 902 is followed by optional block 904, where a value of the informing bit for "terminate" (T) is determined. Similarly to determining the value of L, the value of T may also be determined by the communication protocol, or by the RFID reader and forwarded to the RFID tag.

In a further embodiment, the informing bit may be one symbol of each word in the data stream, and T may be the value "0" or "1", indicating that the associated word is the last word in the stream. Processing then proceeds to block 906.

At block 906, an (L+1)-numbered group of bits is received and isolated, by being separated from the stream. As described previously, each group of bits in the stream includes one or more informing bits, and an associated word. If, as is preferred, there is only one informing bit, the word length is L bits. Processing them proceeds to block 908.

The bits may be received in a number of ways, such as from outside the component. In one embodiment, wireless data is received from an antenna, and decoded to generate the stream.

At block 908, one bit of the isolated group is designated as an informing bit. The remaining bits are designated as the associated word. The placement of the informing bit relative to the isolated group may be designated as described above. Processing then proceeds to decision block 910.

At block 910, a decision is made whether informing bit has the value T. If the decision is affirmative, processing proceeds to block 914. If the decision is negative, processing proceeds to block 912. A negative decision indicates the current group of symbols is not the last group in the stream.

At block 912, the word designated at block 908 is appended to a reception block, which is formed by appending to the stream words designated as in block 908. Naturally, if the word designated in block 908 was the first, it can be the start of the reception block. Processing then returns to block 906, to receive and isolate another group of symbols from the stream.

An affirmative decision at block 910 indicates the last received group of bits was the last of the stream. At block 914, the associated word is appended to the reception block. Reception and separation of words from the stream is also terminated at this block. Processing then proceeds to block 916.

At block 916, the reception block is forwarded for further processing. Further processing may include storing the reception block in a memory circuit, modifying the reception block, backscattering to convey the reception block, and the like.

The reception block may include any type of information. For example, it can be information associated with an identification of the RFID tag, information associated with an identification of an object that is attached to the RFID tag, a protocol parameter, user-specified information, a password, and so on. For example, a processing circuit may be arranged to disable the RFID tag upon receiving a "kill" command from the RFID reader in the reception block, such that the RFID tag no longer responds to an RFID reader.

Figure 10:
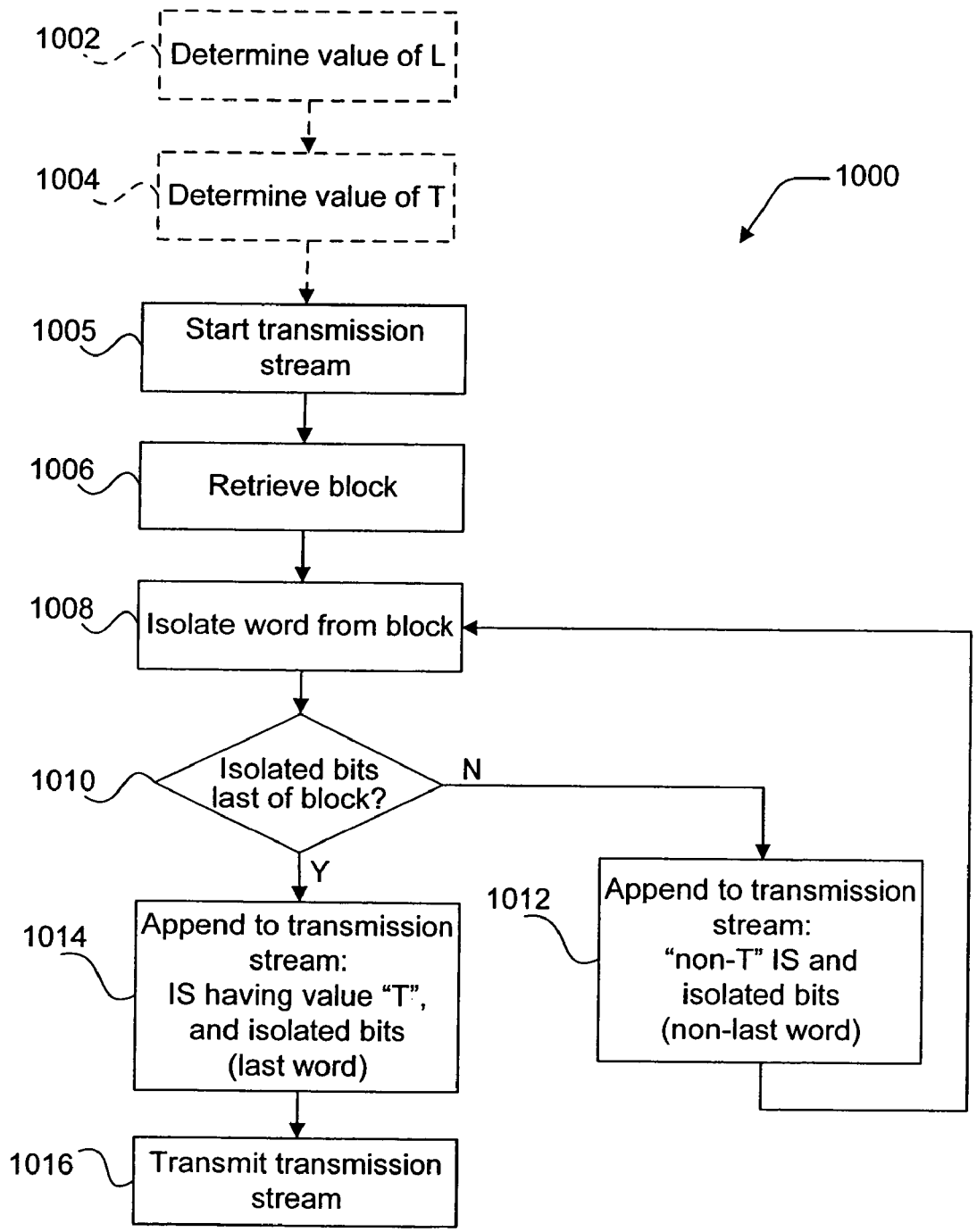
FIG. 10 is a flowchart illustrating one embodiment of a process of a transmit mode communication in an RFID system.

FIG. 10 is a flowchart illustrating one embodiment of process 1000 for employing an informing signal in a transmit mode communication between components of an RFID system. As with FIG. 9, the present description covers equivalently tags and readers.

Process 1000 begins with optional block 1002 where a size L of a word is determined. The value of L may be determined as described above in conjunction with FIG. 9.

Optional block 1002 is followed by optional block 1004, where a value of the informing bit for "terminate" (T) is determined. The value of T may also be determined as described above in conjunction with FIG. 9. Processing then proceeds to block 1005.

At block 1005, a transmission stream is started. As will be seen below, the transmission stream will be formed by appending isolated words and information signals to it. Processing them proceeds to block 1006.

At block 1006, a block of bits is retrieved. The block may include data drawn from the memory circuit, and/or received by the processing circuit, and so on. Processing them proceeds to block 1008.

At block 1008, up to L bits are isolated from the block of bits, and are designated as a new word. Following block 1008, a decision is made at decision block 1010 whether the new word includes the last bits in the block or not. If the decision is affirmative, processing proceeds to block 1014. If the decision is negative, processing proceeds to block 1012. A negative decision indicates more words may be isolated from the block of bits.

At block 1012, a non-T symbol is encoded to the transmission stream. The new word is then also appended to a transmission stream. Naturally, if the word designated in block 1012 is the first, it can be the start of the transmission stream. Processing then returns to block 1008, to isolate another word from the block.

An affirmative decision at block 1010 indicates the last isolated word was the last word of the block. At block 1014, an information signal equaling a termination is encoded to the last associated word to form the last group, and the last group is appended to the transmission stream. Isolation of words from the block of bits is also terminated at this block. Processing then proceeds to block 1016.

At block 1016, the transmission stream is transmitted. The stream may be modulated onto a carrier wave, such as by a modulator, as per the above.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An integrated circuit (IC) for a Radio Frequency IDentification (RFID) tag that has an antenna arranged to receive a wireless wave, comprising:
   circuitry that is arranged to generate a stream of bits from the wave;
   a memory; and
   a processing block that is arranged to:
   (a) isolate a group of the bits from the stream,
   (b) designate at least one of the isolated bits as an informing signal,
   (c) designate the remaining bits of the group as a word,
   (d) append the word to a previously similarly designated word for forming a reception block, and
   (e) if the informing signal does not equal a preset termination return to (a), else terminate appending and perform an action that uses the reception block as one of an address for the memory and content for the memory.

2. The IC of claim 1, wherein
   the processing block is further arranged to determine whether the reception block is associated with the address and the content.

3. The IC of claim 2, wherein
   if the reception block is associated with the address, the processing block is further arranged to access the address for at least one of retrieving data and storing data.

4. The IC of claim 2, wherein
   if the reception block is associated with the content, the processing block is further arranged to determine whether the content includes at least a portion of a command.

5. The IC of claim 1, wherein
   a size of the group is one of 8 and 16.

6. The IC of claim 1, wherein
   the termination is one of a 0 bit and a 1 bit.

7. A Radio Frequency IDentification (RFID) tag, comprising:
   an antenna arranged to receive a wireless wave;
   circuitry that is arranged to generate a stream of bits from the wave;
   a memory; and
   a processing block that is arranged to:
   (a) isolate a group of the bits from the stream,
   (b) designate at least one of the isolated bits as an informing signal,
   (c) designate the remaining bits of the group as a word,
   (d) append the word to a previously similarly designated word for forming a reception block, and
   (e) if the informing signal does not equal a preset termination return to (a), else terminate appending and perform an action that uses the reception block as one of an address for the memory and content for the memory.

8. The tag of claim 7, wherein
   the processing block is further arranged to determine whether the reception block is associated with the address and the content.

9. The tag of claim 8, wherein
   if the reception block is associated with the address, the processing block is further arranged to access the address for at least one of retrieving data and storing data.

10. The tag of claim 8, wherein
    if the reception block is associated with the content, the processing block is further arranged to determine whether the content includes at least a portion of a command.

11. The tag of claim 7, wherein
    a size of the group is one of 8 and 16.

12. The tag of claim 7, wherein
    the termination is one of a 0 bit and a 1 bit.

* * * * *